United States Patent [19]

Wikholm

[11] 3,766,336

[45] Oct. 16, 1973

[54] CIRCUIT ISOLATING SWITCHING ARRANGEMENT

[76] Inventor: Ilmar Veikko Wikholm, R.R. 2 Whitby, Ontario, Canada

[22] Filed: Oct. 12, 1972

[21] Appl. No.: 296,981

[52] U.S. Cl. ......... 179/175.3, 340/253, 179/175.2 C

[51] Int. Cl. ............................................ H04b 3/46

[58] Field of Search .................. 179/175.3, 175.2 C, 179/1 MN, 2 A; 340/253, 256

[56] References Cited

UNITED STATES PATENTS

| | | | |
|---|---|---|---|
| 3,725,613 | 4/1973 | Allen et al. | 179/175.3 |
| 3,636,280 | 1/1972 | Wetzel | 179/175.3 |

*Primary Examiner*—William C. Cooper
*Assistant Examiner*—Douglas W. Olms
*Attorney*—J. A. Legris

[57] ABSTRACT

A circuit for isolating an equipment from a balanced telephone transmission line for the purpose of testing the line for ground faults comprises a four-terminal network having a pair of input terminals for connection to the transmission line and a pair of output terminals for connection to the equipment, a pair of series-connected elements forming a potential divider connected between said input terminals, each of said elements comprising a series-tuned circuit tuned to a predetermined frequency which is higher than the maximum frequency normally to be transmitted by the line, a pair of normally closed relay contacts connected between said input terminals and output terminals, and relay operating means connected between the midpoint of the potential divider and ground for opening said contacts in response to a signal at said predetermined frequency being applied to the line.

4 Claims, 1 Drawing Figure

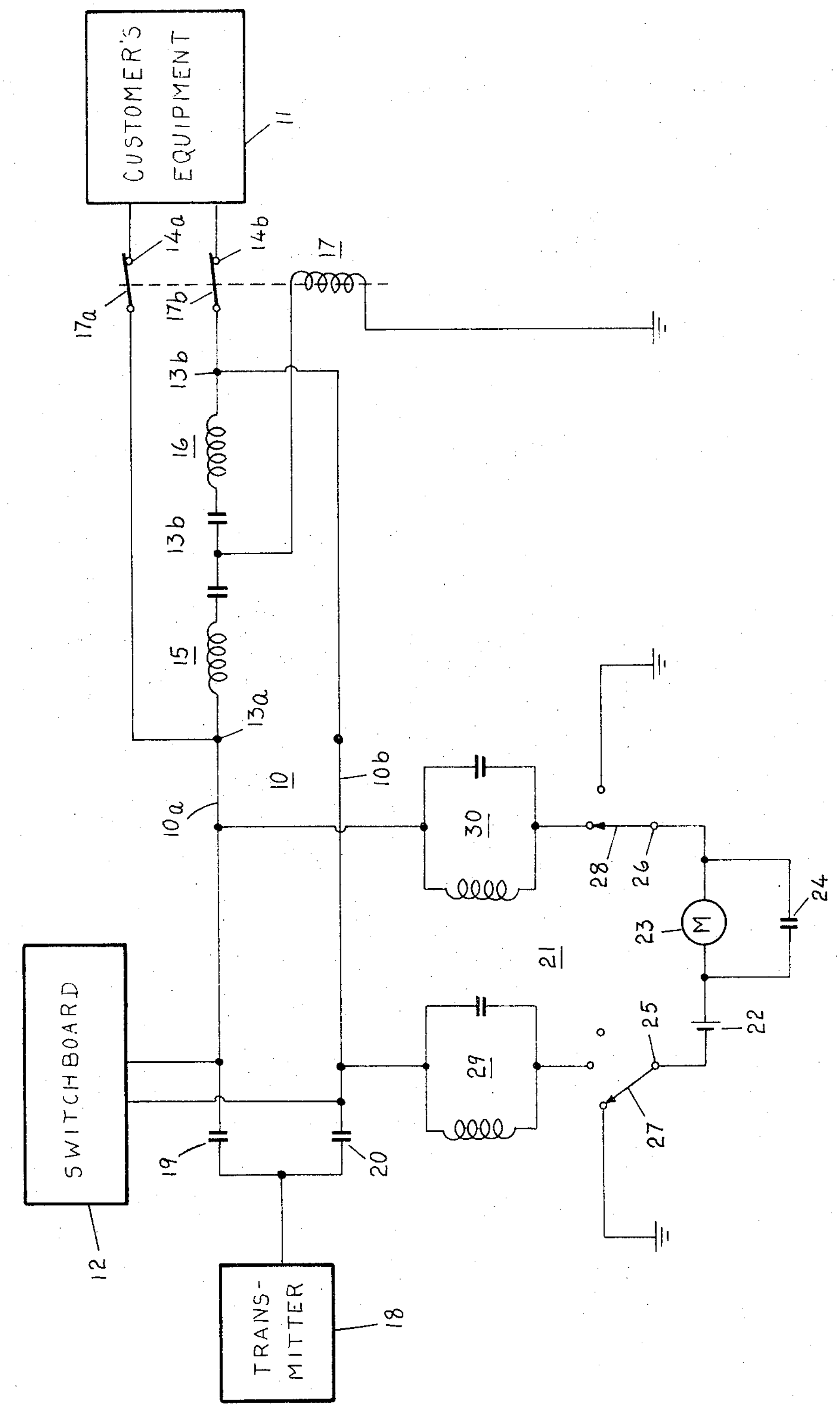
CUSTOMER'S EQUIPMENT
SWITCHBOARD
TRANS-MITTER

CIRCUIT ISOLATING SWITCHING ARRANGEMENT

This invention relates to a switching arrangement for isolating an equipment from a balanced transmission line, such as a telephone transmission line, for example, in response to a signal impressed on the line at a remote location.

The invention is especially applicable to telephone systems in which lines are leased to subscribers for use with equipment which is not serviced by the telephone company, computer terminal devices being typical of such equipment. At the present time, if a line fault is detected, it is not readily apparent whether the fault has occurred in the line itself or in the equipment connected to the line. When such a fault is reported the line must be inspected, and if the fault is due to faulty equipment connected to the line a considerable wastage of time may result.

It is an object of the present invention to provide a circuit isolating switching arrangement for isolating a balanced transmission line from an equipment connected thereto in response to a signal applied to the line at a remote station, whereby the line can be tested independently of the subscriber's equipment normally connected to it.

According to the invention, such a switching arrangement comprises a four-terminal network having a pair of input terminals for connection to the transmission line and a pair of output terminals for connection to the equipment, a pair of series-connected elements forming a potential divider connected between said input terminals, each of said elements comprising a series-tuned circuit tuned to a predetermined frequency which is higher than the maximum frequency normally to be transmitted by the line, a pair of normally closed relay contacts connected between said input terminals and output terminals, and relay operating means connected between the midpoint of the potential divider and ground for opening said contacts in response to a signal at said predetermined frequency being applied to the line.

In order that the invention may be readily understood, one embodiment thereof will now be described, by way of example, with reference to the accompanying drawing, which is a schematic wiring diagram of the arrangement in combination with a telephone line and test set therefor.

Referring to the drawing, the telepone line 10 comprises a pair of balanced conductors 10*a*, 10*b*, to which is connected a subscriber's equipment 11, which may be a computer terminal device. The conductors 10*a*, 10*b*, of course, continue to a switchboard 12 at the central exchange. Connected in circuit with the transmission line is a four terminal network; this comprises a first pair of terminals, or input terminals 13*a*, 13*b*, which are connected to the line conductors 10*a*, 10*b*, and a second pair of terminals, or output terminals 14*a*, 14*b*, connected to the subscriber's equipment 11. A pair of series-connected elements constituted by series-tuned circuits 15, 16 form a potential divider between the terminals 13*a*, 13*b*, and the midpoint of the potential divider is connected to ground through the coil of an a.c. relay 17. The series-tuned circuits, in the present example, are tuned to the frequency 40kc/s, which is substantially higher than any frequency normally to be transmitted by the telephone line. The a.c. relay 17 has a pair of normally closed contacts 17*a*, 17*b*, which are connected between the input terminals 13*a*, 13*b* and output terminals 14*a*, 14*b*. It is clear that the operation of the relay 17 will cause the contacts 17*a*, 17*b* to open and so isolate the equipment 11 from the line 10.

At the central exchange is a transmitter 18 which can be operated to produce a carrier signal at 40kc/s as required. Normally, with the transmitter 18 inoperative, the telephone system operates normally with the equipment 11 connected to the line as shown, the contacts 14*a* 14*b* being closed and the transmitter being isolated for normal line frequencies by decoupling capacitors 19, 20.

In order to isolate the line from the equipment 11, to test the line for a fault reported, an operator at the central exchange actuates the transmitter 18, the 40kc/s carrier signal thus being impressed on the line. This signal (unless there is a fault on each of the conductors 10*a*, 10*b*) is by-passed to ground via one or both of the series-tuned circuits 15,16, and the relay coil 17. The relay is thus energized and the contacts 17*a*, 17*b* open so as to disconnect the equipment 11.

The line conductors can now be tested without regard to the nature of the subscriber's equipment 11. The testing is performed, in the present example, by means of a test set, generally designated by the reference 21, located at the central exchange. This consists of an insulation tester comprising a d.c. source 22 and a meter 23 across which a by-pass capacitor 24 is connected, the insulation tester having terminals 25, 26 connected to the movable contacts of a pair of selector switches 27, 28. Each of the selector switches is operable to switch the respective terminal 25 or 26 to ground or to a respective line conductor 10*a* or 10*b*. Rejector circuits 29, 30, tuned to 40kc/s, are provided in order to avoid by-passing the applied carrier signal to ground through the test set. By appropriately setting the switches 27, 28, one can readily test for a short circuit between each of the line conductors and ground and between the pair of line conductors.

It is to be understood that the illustrative embodiment of the invention is described by way of example only; numerous variations within the scope of the invention may be made. For example, the relay 17 instead of being an a.c. relay may be replaced by a d.c. relay energized from a rectifier circuit, or may be replaced by a solid state relay. Furthermore, the test set 21, which forms no part of the circuit isolating switching arrangement and is not an essential part of the invention in its broadest aspect, may be of any known type suitable for the purpose.

What I claim as my invention is:

1. A circuit isolating switching arrangement for isolating a balanced transmission line from an equipment connected thereto, comprising a four-terminal network having a pair of input terminals for connection to the transmission line and a pair of output terminals for connection to the equipment, a pair of series-connected elements forming a potential divider connected between said input terminals, each of said elements comprising a series-tuned circuit tuned to a predetermined frequency which is higher than the maximum frequency normally to be transmitted by the line, a pair of normally closed relay contacts connected between said input terminals and output terminals, and relay operating means connected between the midpoint of the potential divider and ground for opening said contacts in response to a signal at said predetermined frequency being applied to the line.

2. In a telephone system comprising a balanced transmission line having an equipment connected thereto at a subscriber's station, means for isolating the equipment from the line comprising a four-terminal network having a pair of input terminals connected to the line and a pair of output terminals connected to the equipment, a pair of series-connected elements forming a potential divider connected between said input terminals, each of said elements comprising a series-tuned circuit tuned to a test frequency which is higher than the maximum frequency normally to be transmitted by the line, transmitter means located at a central exchange for impressing a signal at said test frequency on the line, a pair of normally closed relay contacts connected between said input and output terminals, and relay operating means connected between the midpoint of the potential divider and ground for opening said contacts in response to an impressed test signal.

3. In combination with a balanced telephone transmission line having an equipment connected thereto at a subscriber's station, i. a four-terminal network having a pair of input terminals connected to the line and a pair of output terminals connected to said equipment, a pair of series-connected elements forming potential divider connected between said input terminals, each of said elements comprising a series-tuned circuit tuned to a predetermined frequency higher than the maximum frequency normally to be transmitted by the line, a pair of normally closed relay contacts connected between said input terminals and output terminals, and relay operating means connected between the midpoint of the potential divider and ground for opening said contacts in response to a signal at said predetermined frequency, ii. transmitter means located at a central exchange for applying to the line a signal at said predetermined frequency, whereby to operate the relay to open said contacts, iii. and selective testing means located at the central exchange for testing for continuity from each of the line conductors to ground and to each other.

4. The combination claimed in claim 3, wherein the selective testing means comprises an insulation tester having first and second terminals, a first selector switch connected to the first terminal for switching the first terminal selectively to ground or to one line conductor, and a second selector switch connected to the second terminal for switching the second terminal to ground or the other line conductor.

* * * * *